(12) United States Patent
Carrillo et al.

(10) Patent No.: US 8,375,193 B2
(45) Date of Patent: Feb. 12, 2013

(54) SYSTEM, METHOD, AND COMPUTER-READABLE MEDIUM FOR OPTIMIZED DATA STORAGE AND MIGRATION IN A DATABASE SYSTEM

(75) Inventors: Criselda Carrillo, San Diego, CA (US); Paul Rubio, San Diego, CA (US); Paul Andersen, San Diego, CA (US); Donn Holtzman, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 300 days.

(21) Appl. No.: 12/472,414

(22) Filed: May 27, 2009

(65) Prior Publication Data
US 2010/0306493 A1 Dec. 2, 2010

(51) Int. Cl.
*G06F 12/00* (2006.01)
(52) U.S. Cl. .......... 711/173; 711/170; 711/E12.001
(58) Field of Classification Search ............ 711/173
See application file for complete search history.

(56) References Cited

U.S. PATENT DOCUMENTS

| 5,719,983 | A * | 2/1998 | Henderson et al. | 386/265 |
| 7,822,939 | B1 * | 10/2010 | Veprinsky et al. | 711/170 |
| 2003/0221055 | A1 * | 11/2003 | Okada | 711/113 |
| 2006/0004957 | A1 * | 1/2006 | Hand et al. | 711/113 |

* cited by examiner

*Primary Examiner* — Hashem Farrokh
*Assistant Examiner* — Larry MacKall
(74) *Attorney, Agent, or Firm* — Steve McDonald; Ramin Mahboubian (57) ABSTRACT

The frequency with which data is accessed within the system may be periodically monitored and a corresponding access frequency quantifier assigned to the data is updated accordingly. The data access frequency quantifier may be associated with a storage device zone speed quality rating. The association between data access frequency quantifiers and the storage device zone speed quality ratings may be made in a hierarchical association such that quantifiable differentials may be ascertained between a particular access frequency quantifier and a storage device zone speed quality rating. In this manner, when no storage zone having a speed quality rating that is associated with data having a particular access frequency quantifier is available for storage of the data, a storage zone having a speed quality rating more proximate the speed quality rating associated with the access frequency quantifier may be identified for migration.

12 Claims, 6 Drawing Sheets

SYSTEM, METHOD, AND COMPUTER-READABLE MEDIUM FOR OPTIMIZED DATA STORAGE AND MIGRATION IN A DATABASE SYSTEM

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, as determined by an optimizer. The response time is the amount of time it takes to complete the execution of a query on a given system.

In computer systems featuring a plurality of hard disks, contiguous areas of storage space of a hard disk or other storage medium, e.g., extents, may be allocated based on a least disk utilized algorithm where the disk with the highest free percentage is used as the target device for the next algorithm. In a system with non-skewed balanced nodes, least disk utilization algorithms generally perform satisfactorily. However, in systems featuring node skew, such mechanisms may result in undesirable system performance.

SUMMARY

Disclosed embodiments provide a system, method, and computer readable medium for optimized storage and migration of data in a massively parallel processing system. In accordance with an embodiment, a device profiler allows testing storage device zones and assignment of a respective speed quality rating thereto based on the zone's evaluated access speed. A temperature monitor may periodically evaluate the frequency with which data is accessed within the system and may update a data access frequency quantifier, such as a data temperature, accordingly. A data access frequency quantifier, such as a data temperature, may be associated with a storage device zone speed quality rating such that data having a particular data access frequency is preferably stored on a device storage zone having a speed quality rating associated with the data access frequency quantifier. In an embodiment, the association between data access frequency quantifiers and the storage device zone speed quality ratings may be made in a hierarchical association such that quantifiable differentials may be ascertained between a particular access frequency quantifier and a storage device zone speed quality rating. In this manner, when no storage zone having a speed quality rating that is associated with data having a particular access frequency quantifier is available for storage of the data, a storage zone having a speed quality rating more proximate the speed quality rating associated with the access frequency quantifier may be identified for storage or migration of the data.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Contemporary database system tools enable system resources, such as hard disks, to be profiled to allow users to stipulate "temperatures" to specific storage device zones thereby providing the opportunity to improve performance by placing special, frequently accessed data on faster portions of devices. Modern database systems may feature groups of individual disk drives or other storage media, and thus a zone of contiguous storage space, such as a track, sectors, blocks, extents, etc., of a particular device can't be assumed to be, for example, fastest based on the zone's ID. As referred to herein, a data storage device zone comprises a contiguous physical section of storage space of a data storage medium. A device profiler allows testing each zone individually and assignment of a numerical value representing a profiled access speed to the tested zone. Further, users may assign a relative temperature to an allocation request and to provide guidelines on how devices should be split-up amongst performance zones. As referred to herein, a data "temperature" comprises a data access frequency quantifier that specifies the frequency of access of particular data. For example, data that is frequently accessed may be qualified with a temperature of "HOT" while data that is infrequently accessed may be assigned a temperature of "COOL."

Figure 1:
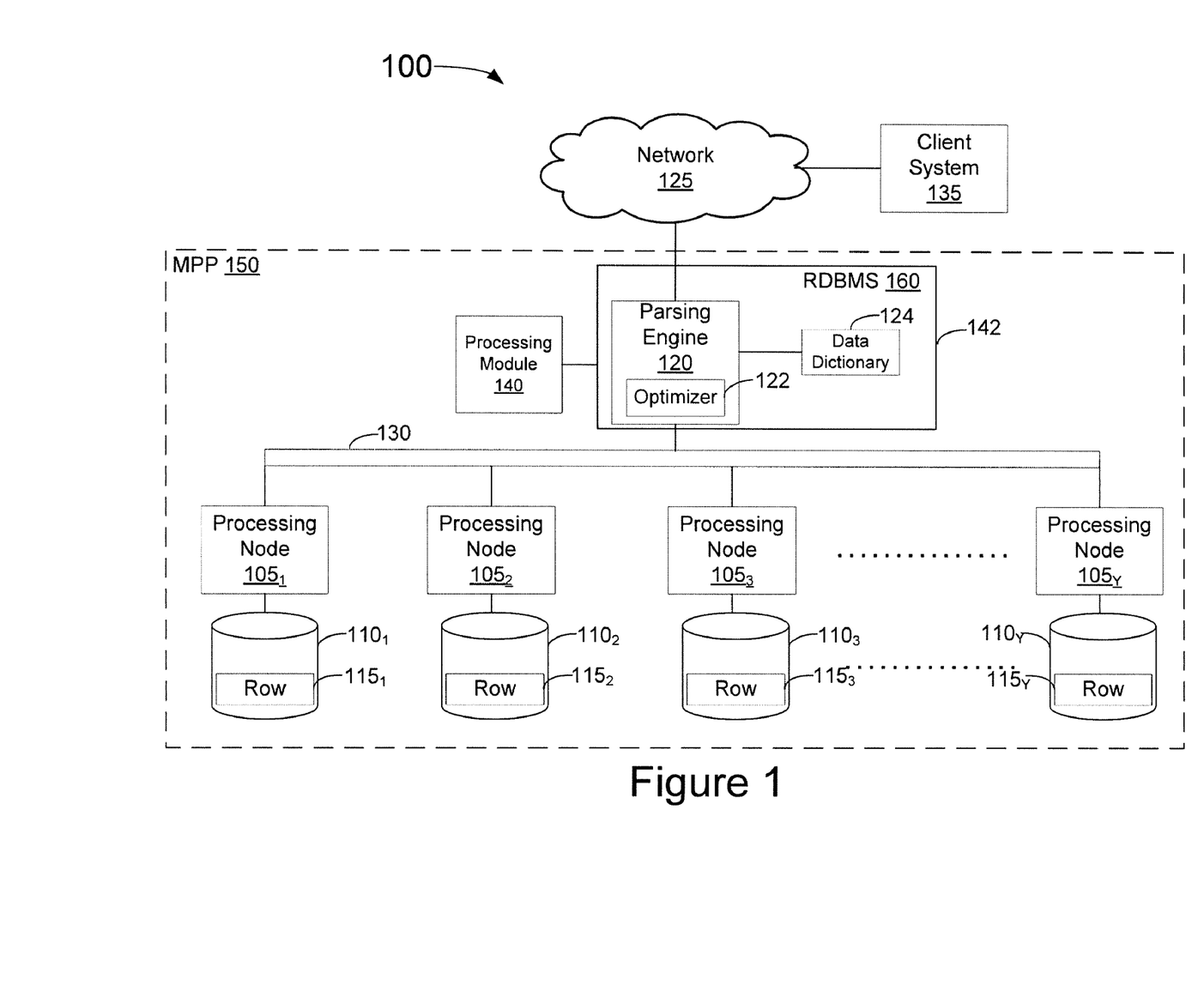
FIG. 1 depicts a diagrammatic representation of an exemplary architecture for a large database system that is suited for implementing data allocation and migration mechanisms in accordance with disclosed embodiments.

FIG. 1 depicts a diagrammatic representation of an exemplary architecture for a large database system 100, such as a Teradata Active Data Warehouse System, that is suited for implementing data allocation and migration mechanisms in accordance with disclosed embodiments. The database system 100 includes a relational database management system (RDBMS) 160 built upon a massively parallel processing (MPP) system 150. Other types of database systems, such as object-relational database management systems (ORDBMS) or those built on symmetric multi-processing (SMP) platforms, are also suited for use, and the depicted and described architecture is exemplary only and is chosen to facilitate an understanding of the disclosed embodiments.

As shown, the database system 100 includes one or more processing nodes $105_{1...Y}$ that manage the storage and retrieval of data in data-storage facilities $110_{1...Y}$. Each of the processing nodes may host one or more physical or virtual processing modules, such as one or more access module processors (AMPs). Each of the processing nodes $105_{1...Y}$ manages a portion of a database that is stored in a corresponding one of the data-storage facilities $110_{1...Y}$. Each of the data-storage facilities $110_{1...Y}$ includes one or more disk drives or other storage medium.

The system stores data in one or more tables in the data-storage facilities $110_{1...Y}$. The rows $115_{1...Y}$ of the tables are stored across multiple data-storage facilities $110_{1...Y}$ to ensure that the system workload is distributed evenly across the processing nodes $105_{1...Y}$. A parsing engine 120 organizes the storage of data and the distribution of table rows $115_{1...Y}$ among the processing nodes $105_{1...Y}$ and accesses processing nodes $105_{1...Y}$ via an interconnect 130. The parsing engine 120 also coordinates the retrieval of data from the data-storage facilities $110_{1...Y}$ in response to queries received from a user, such as one at a client computer system 135 connected to the database system 100 through a network 125 connection. The parsing engine 120, on receiving an incoming database query, applies an optimizer 122 component to the query to assess the best plan for execution of the query. Selecting the optimal query-execution plan includes, among other things, identifying which of the processing nodes $105_{1...Y}$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The database system typically receives queries in a standard format, such as the Structured Query Language (SQL) put forth by the American National Standards Institute (ANSI).

Figure 2:
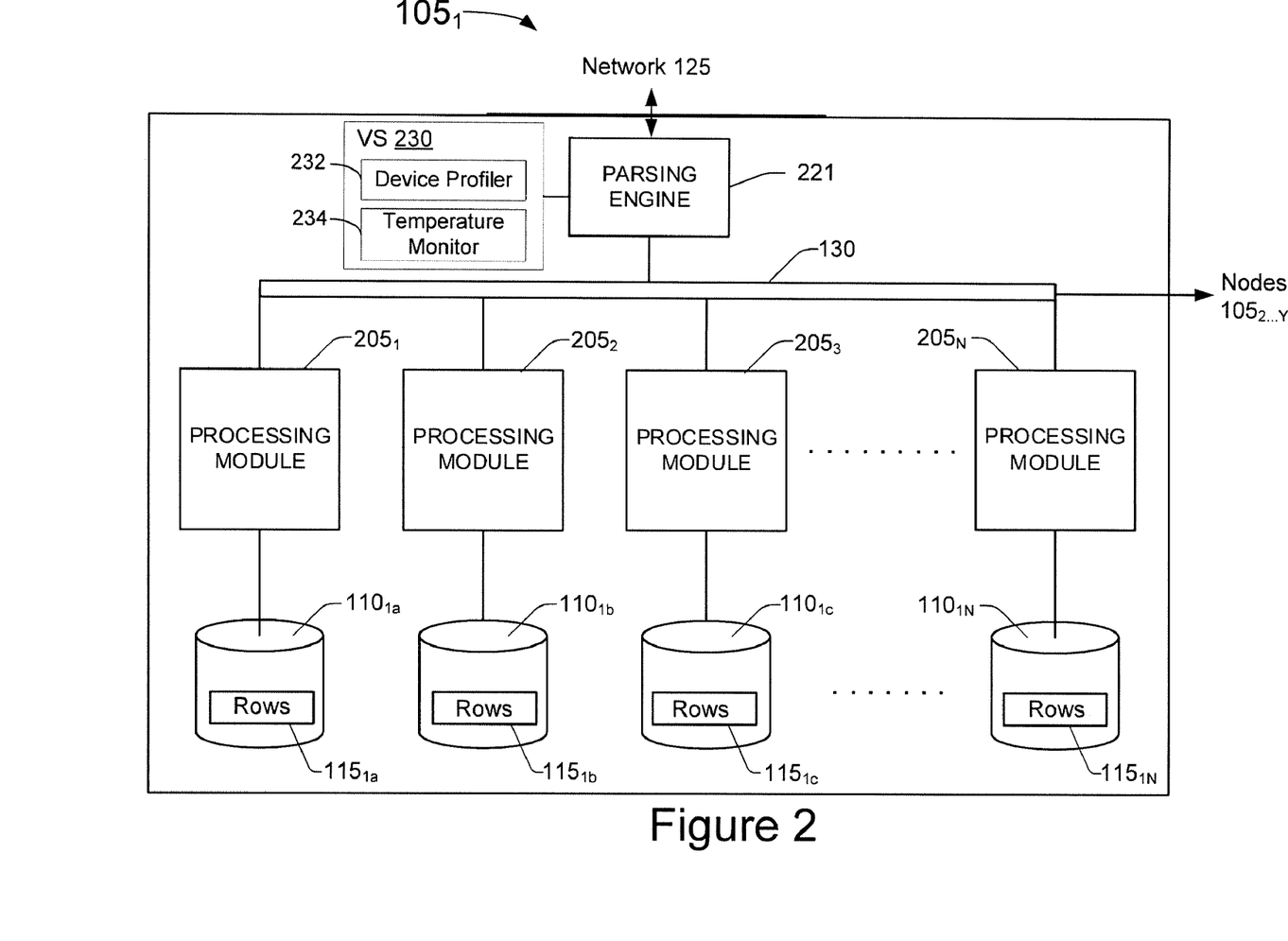
FIG. 2 depicts a diagrammatic representation of a sample architecture for one node of the database system depicted in FIG. 1 implemented in accordance with an embodiment.

FIG. 2 depicts a diagrammatic representation of a sample architecture for one node $105_1$ of the DBS 100. The DBS node $105_1$ includes one or more processing modules $205_{1...N}$ connected by an interconnect 130 that manage the storage and retrieval of data in data-storage facilities $110_{1a...1N}$. Each of the processing modules $205_{1...N}$ may be one or more physical processors or each may be a virtual processor, with one or more virtual processors running on one or more physical processors. For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $205_{1...N}$ manages a portion of a database that is stored in a corresponding one of the data-storage facilities $110_{1a...1N}$. Each of the data-storage facilities $110_{1a...1N}$ includes one or more disk drives or other storage mediums. The DBS may include multiple nodes $105_{2...Y}$ in addition to the illustrated node $105_1$ connected by way of the interconnect 130.

The system stores data in one or more tables in the data-storage facilities $110_{1a...1N}$. The rows $115_{1a...1N}$ of the tables are stored across multiple data-storage facilities $110_{1a...1N}$ to ensure that the system workload is distributed evenly across the processing modules $205_{1...N}$. A parsing engine 221 organizes the storage of data and the distribution of table rows $110_{1a...1N}$ among the processing modules $205_{1...N}$. The parsing engine 221 also coordinates the retrieval of data from the data-storage facilities $110_{1a...1N}$ in response to queries received from a user at a client computer system $135_{1...N}$. The DBS 100 usually receives queries and commands to build tables in a standard format, such as SQL.

In one implementation, the rows $115_{1a...1N}$ are distributed across the data-storage facilities $110_{1a...1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $110_{1a...1N}$ and associated processing modules $205_{1...N}$ by a hash bucket map. The characteristics of the columns chosen for the primary index determine how evenly the rows are distributed.

Figure 3:
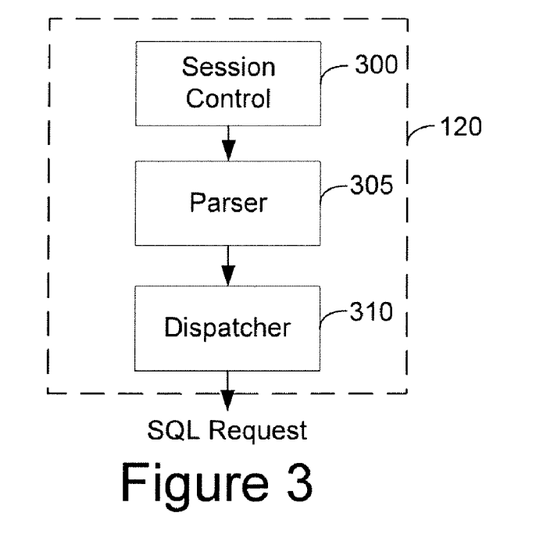
FIG. 3 is a diagrammatic representation of a parsing engine implemented in accordance with an embodiment.
Figure 4:
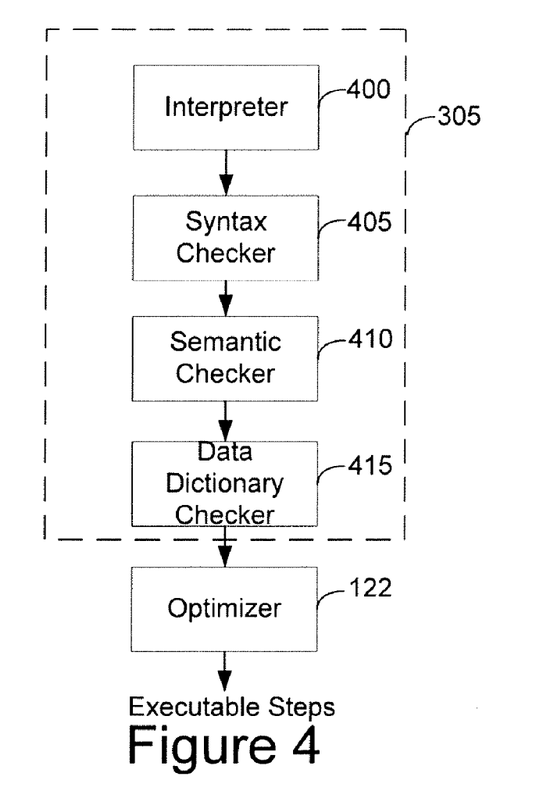
FIG. 4 is a diagrammatic representation of a parser implemented in accordance with an embodiment.

In one example system, a parsing engine, such as the parsing engine 120, is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 runs the optimizer 122 that selects the least expensive plan to perform the request.

In accordance with an embodiment, the system 100 may feature a virtual storage system (VS) 230, e.g., hosted by one or more of the nodes such as node $105_1$ depicted in FIG. 1. The VS 230 may include a device profiler 232 and a temperature monitor module 234 each implemented as a set of computer-executable instructions tangibly embodied on a computer-readable medium that are executable by a processing system, such as one or more processing nodes $105_1$-$105_Y$. In an embodiment, the device profiler 232 is configured to differentiate between storage device zones based on the zone's input/output speed performance on any given device. In this manner, for a particular storage device, the device profiler 232 is able to determine with high accuracy whether one zone of a storage device exhibits faster or slower data access than another storage zone of the storage device or another zone of a different storage device. The temperature monitor 234 may periodically monitor the frequency with which data is accessed within the system 100 and may update a data access frequency quantifier associated therewith accordingly. For example, in disclosed embodiments, data may be associated with data access frequency quantifiers of "HOT," "WARM," and "COOL" that respectively indicate the corresponding data is frequently accessed, moderately accessed, and infrequently accessed. The temperature monitor 234 may periodically evaluate the amount of data accesses to a particular set of data and update the corresponding data access frequency quantifier accordingly.

Figure 5:
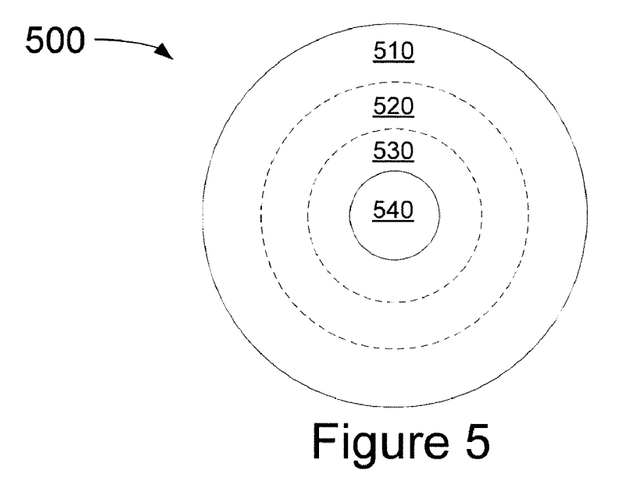
FIG. 5 is a diagrammatic representation of a platter of a hard disk drive that may be deployed as a storage device in the system depicted in FIG. 1.

FIG. 5 is a diagrammatic representation of a platter 500 of a hard disk drive that may be deployed as a storage device, e.g., as one of data storage facilities $110_1$-$110_Y$, in system 100. Platter 500 comprises a non-volatile storage medium featuring one or more magnetic surfaces which store digitally encoded data thereon as the platter 500 is rapidly rotated, e.g., by a spindle on which the platter 500 is mounted via a platter aperture 540. As is understood, information is written to the platter 500 as it is rotated past read and write heads.

Data transfer rates are generally higher for tracks located near the outer periphery of the platter and generally decrease for data tracks more inner-located on the platter surface. Thus, for example, data transfer rates are generally higher for an outer section 510 than for tracks located more proximate to an inner area of the platter, such as section 520. The lower transfer rates are generally observed on the most interior tracks, such as those located on inner section 530.

The frequency of data access critically impacts the optimization of data storage and retrieval in system 100. In an embodiment, a data access frequency quantifier is assigned or otherwise associated with data and provides an indication or measure of the physical frequency of accesses to the corresponding data. In a particular embodiment, the data access frequency is associated with data as a data "temperature." Data "temperature" is commonly understood to represent the frequency of access to data as a measure of the interaction, level of interest, and importance of that data. Specifically, the data temperature is a measure of physical accesses to data, wherein data with a "HOT" temperature is frequently accessed, data with a "WARM" temperature is moderately accessed, and data with a "COOL" temperature is infrequently accessed. It should be understood that the disclosed data access frequency quantifiers of "HOT," "WARM," and "COOL" are exemplary only, and any number of data access frequency quantifiers may be suitably assigned to data to provide an indication of the frequency with which the corresponding data is accessed.

In accordance with disclosed embodiments, system tools include a device profiler 232 that provides the ability to differentiate between storage device zones based on the zones input/output speed performance on any given device. In this manner, for a particular storage device, systems tools allow for determining, with high accuracy, whether one zone of a storage device exhibits faster or slower data access than another storage zone of the device or another storage zone of a different storage device. Systems that feature a large number of storage devices, such as system 100, may feature heterogeneous storage devices. For example, system 100 may employ storage devices of a variety of technologies, such as magnetic disk drives, optical drives, solid-state storage devices, etc, and may employ storage devices of various manufacturers. Thus, even storage devices of a common technology may feature disparate storage performance. For example, system 100 may include magnetic disk drives of varying sizes, operational rotation speeds, or other differing performance characteristics. Because the storage devices deployed in system 100 may comprise a group of individual disk drives or other storage media with varying performance characteristics, it is generally not accurate to assume a particular zone of a storage medium is fastest relative to other storage devices based on its storage device zone. For instance, one magnetic disk drive may have an outer zone, such as one located in section 510 of the platter 500, that features slower I/O speeds than an interior zone of another drive, such as another more expensive storage device. The device profiler 232 addresses such issues by testing various zones of contiguous storage space individually and assigning each tested zone a numerical value representing its absolute access speed. In this manner, the access speed of one storage device zone of a storage medium may be determined to be faster or slower than other storage device zones of the storage medium. Further, the access speed of one storage device zone of a storage medium may be determined to be faster or slower than another storage device zone of a different storage medium.

Figure 6:
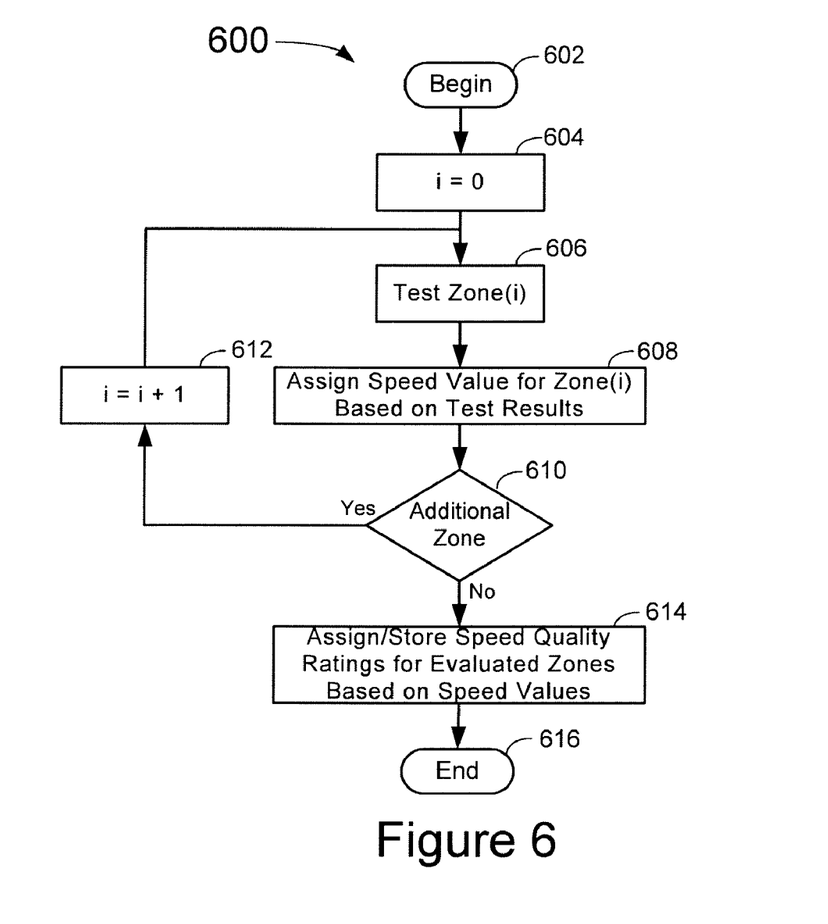
FIG. 6 is a flowchart that depicts a device profiler storage device zone evaluation process implemented in accordance with an embodiment.

FIG. 6 is a flowchart 600 that depicts a device profiler storage device zone evaluation process implemented in accordance with an embodiment. The processing steps of FIG. 6 may be implemented as computer-executable instructions tangibly embodied on a computer-readable medium executable by a processing system, such as one or more of the processing nodes $105_1$-$105_Y$ depicted in FIG. 1.

The evaluation process is invoked (step 602), and an index variable may be initialized (step 604). A first zone(i) is then tested (step 606), e.g., by writing and/or reading data to the zone(i) and evaluating the access speed thereof, such as MB/s. The storage device zone may comprise, for example, one or more tracks, sectors, blocks, extents, or other contiguous storage space allocations. A speed value, such as a numerical value, is then assigned to the tested zone(i) based on the evaluated access speed (step 608). An evaluation may then be made to determine if an additional zone remains for evaluation (step 610). If an additional zone remains on the tested storage device, the evaluation process may increment the index (step 612) and return to step 606 to evaluate the next zone(i) access speed.

When no additional storage device zones remain for evaluation, a speed quality rating may be assigned to each tested zone based on the speed value of the respective zone, and the assigned speed quality rating may then be stored (step 614). For example, the speed values assigned to the tested zones according to step 608 may comprise numerical speed values that are associated with discrete speed quality ratings. Thus, a wide range of access speed values may be mapped to a more manageable size of speed quality ratings. In an embodiment, speed quality ratings that may be assigned to evaluated zones may include three speed quality ratings, such as "FAST," "AVERAGE," and "SLOW," although any number of speed quality ratings may be utilized. The profiler 232 preferably stores a zone identifier and corresponding speed quality rating for each evaluated zone of the tested storage device according to step 614. The zone evaluation process cycle may then end (step 616). Any number of storage devices may be similarly evaluated by the device profiler 232. In this manner, access speeds of zones on a common device and among a plurality of devices may be accurately compared with one another by way of the speed quality ratings.

It is desirable to store data that is more frequently accessed relative to other data in storage device zones that have higher access speeds relative to other storage device zones. In a similar manner, it is desirable to store data that is less frequently accessed on storage device zones that have lower access speeds relative to other storage device zones. In accordance with an embodiment, access frequency quantifiers, such as data temperatures, may be associated with storage device zone speed quality ratings. For example, it is desirable to store data that is frequently accessed, e.g., data having a temperature of "HOT," to a storage device zone having a "FAST" speed quality rating. In a similar manner, it may be desirable to store data having a temperature of "WARM" to a storage device zone having an "AVERAGE" speed quality rating, and data having a temperature of "COOL" to a storage device zone having a "SLOW" speed quality rating. In the exemplary embodiments of data having temperatures of HOT, WARM, and COOL, and storage device zones having speed quality ratings of FAST, AVERAGE, and SLOW, table 1 depicts an exemplary data temperature and storage zone speed quality rating correspondence or association.

TABLE 1

| Data Temperature | Storage Device Zone Speed Quality Rating |
|---|---|
| HOT | FAST |
| WARM | AVERAGE |
| COOL | SLOW |

In accordance with an embodiment, data having a temperature of HOT, WARM, or COOL should preferably be allocated to a storage device zone having a FAST, AVERAGE or SLOW speed quality rating, respectively. That is, data having a HOT temperature is preferably stored on a storage device zone(s) having a FAST speed quality rating, data having a WARM temperature is preferably stored on a storage device zone(s) having an AVERAGE speed quality rating, and data having a COOL temperature is preferably stored on a storage device zone(s) having a SLOW speed quality rating. In this manner, a correspondence or association between an access frequency quantifier of data and a speed quality rating of a storage device zone is defined.

To facilitate optimized data storage, mechanisms are provided that allow a user to assign a relative temperature to an allocation request. For example, when creating a table to be stored in MPP system 100, a user may specify the table, or a portion thereof, as having a particular data access frequency, e.g., temperature. The system may then attempt to store the data of the allocation request to one or more storage device zones having a corresponding speed quality rating associated with the specified temperature. For example, a user may specify a table, or a portion thereof, of an allocation request as having a HOT temperature. Alternatively, a default temperature value may be assigned to the data. The system may then attempt to store the data of the allocation request to one or more storage device zones having speed quality rating of FAST.

Figure 7:
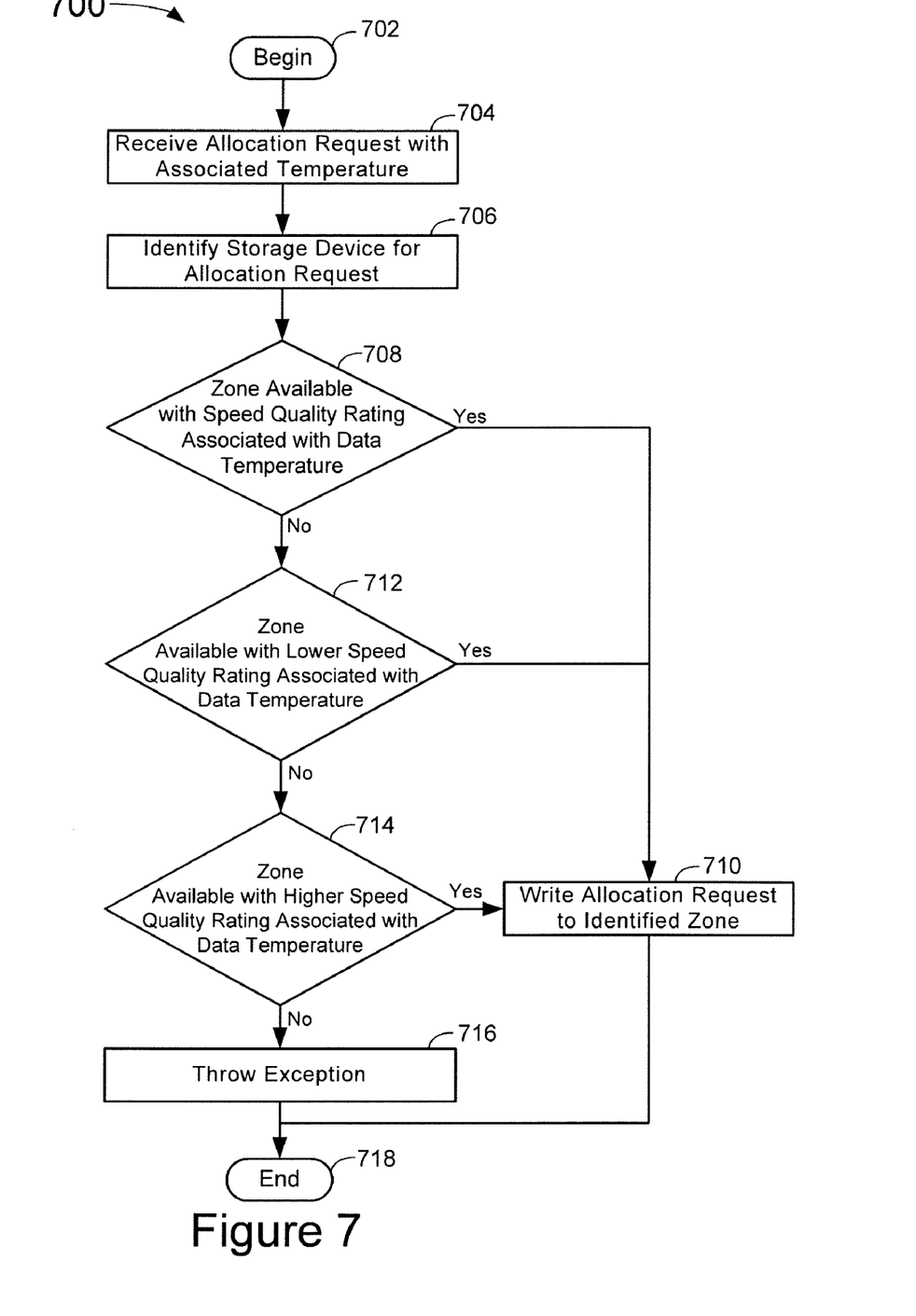
FIG. 7 is a flowchart of a data allocation routine for data storage that accounts for data temperature in accordance with an embodiment.

FIG. 7 is a flowchart 700 of a data allocation routine for data storage that accounts for data temperature in accordance with an embodiment. The processing steps of FIG. 7 may be implemented as computer-executable instructions tangibly embodied on a computer-readable medium executable by a processing system, such as one or more of the processing nodes $105_1$-$105_Y$ depicted in FIG. 1.

The data allocation routine is invoked (step 702), and an allocation request is received with a corresponding associated data temperature (step 704). For example, the user that issued the data allocation request may specify the data temperature or, alternatively, a default data temperature may be assigned to the data of the allocation request. A storage device is then identified for storage of the data of the allocation request (step 706). For example, the least-utilized storage device in the MPP system 100 may be identified for storage of the data of the allocation request. An evaluation may then be made to determine if a storage device zone is available that has a speed quality rating that is associated, or corresponds, with the data temperature of the allocation request (step 708). If a storage device zone having a speed quality rating corresponding to the data temperature is available, the data is then written to the identified zone (step 710), and the data allocation routine cycle may then end (step 718).

Returning again to step 708, if a storage device zone having a speed quality rating corresponding to the data temperature is not identified or otherwise available, the data allocation routine may then evaluate the storage device for the availability of a storage device zone with a lower speed quality rating than that associated with the data temperature (step 712). If a zone is identified with a lower speed quality rating than that associated with the data temperature, the data may then be written to the identified zone according to step 710.

Returning again to step 712, if a storage device zone is not identified with a lower speed quality rating than that associated with the data temperature, an evaluation may be made to determine if a zone is available with a higher speed quality rating than that associated with the data temperature (step 714). If a storage device zone is identified with a higher speed quality rating than that associated with the data temperature, the data may then be written to the identified zone according to step 710. If a storage device zone is not identified with a higher speed quality rating thereby indicating that no storage device zone has been identified for writing of the data of the allocation request, an exception may be thrown (step 716) or, alternatively, another storage device may be evaluated for storage of the data, and the data allocation routine cycle may then end according to step 718.

In accordance with disclosed embodiments, the temperature monitor 234 described with reference to FIG. 2 may periodically update the access frequency quantifier, e.g., the temperature, associated with a particular data set. To this end, the temperature monitor 234 may periodically evaluate the number of accesses to a particular data set over a given period of time and update the temperature, or other access frequency quantifier, associated with the data set. Often, a data set that is initially frequently accessed may, after some period of time, become accessed substantially less frequently. In such an instance, the temperature monitor 234 may adjust the access frequency quantifier associated with the data set. In this event, it may be desirable to migrate the data set to a storage device zone having a lower speed quality rating than that on which the data set is currently stored. Contrarily, a data set that is initially assigned a low access frequency quantifier may become frequently accessed due to, for example, particular interest in the content of the data set. In such an instance, it may be desirable to migrate the data set to a storage device zone having a higher speed quality rating than that on which the data set is currently stored. Such variances in the access frequency of data are quite common and typically disadvantageously effect the overall system performance.

The association between data access frequency quantifiers, e.g., temperature, and the storage device zone speed quality ratings may be made in a hierarchical association such that quantifiable differentials may be ascertained between a particular access frequency quantifier and a storage device zone speed quality rating. For example, Table 2 depicts exemplary discrete differentials of hierarchical associations of data access frequency quantifiers comprising data temperatures and storage device zone ratings.

TABLE 2

DATA ACCESS FREQUENCY QUANTIFIERS/SPEED QUALITY RATING DIFFERENTIALS

| Temperature | Speed | | |
| | FAST | AVERAGE | SLOW |
|---|---|---|---|
| HOT | 0 | 1 | 2 |
| WARM | 1 | 0 | 1 |
| COOL | 2 | 1 | 0 |

Consistent with the exemplary embodiments disclosed hereinabove, data access frequency quantifiers comprising temperatures of "HOT," "WARM," AND "COOL" are associated with corresponding data storage device zone speed quality ratings of "FAST," "AVERAGE," and "SLOW." In the current embodiment, the association between a data access frequency quantifier, such as a data temperature of HOT, WARM, and COOL, and a storage device zone speed quality rating, such as FAST, AVERAGE, and SLOW, is made in a hierarchical manner. Accordingly, a discrete differential between the association of a particular data access frequency quantifier, e.g., the data temperature, and a storage zone speed quality rating may be determined. For example, consecutive speed quality ratings, such as speed quality ratings of FAST and AVERAGE are separated by a discreet quality rating of "one," while a speed quality rating of FAST and SLOW are separated by a discreet speed quality rating of "two." In this manner, a storage zone having a speed quality rating that is not directly associated with a particular data access frequency quantifier may be identified that is more logically proximate to the particular data access frequency quantifier than another data storage zone having a different speed quality rating. Accordingly, when no storage zone having a speed quality rating that is associated with data having a particular access frequency quantifier is available for storage of the data, a storage zone having a speed quality rating more proximate the speed quality rating associated with the access frequency quantifier may be identified for storage or migration of the data.

Figure 8:
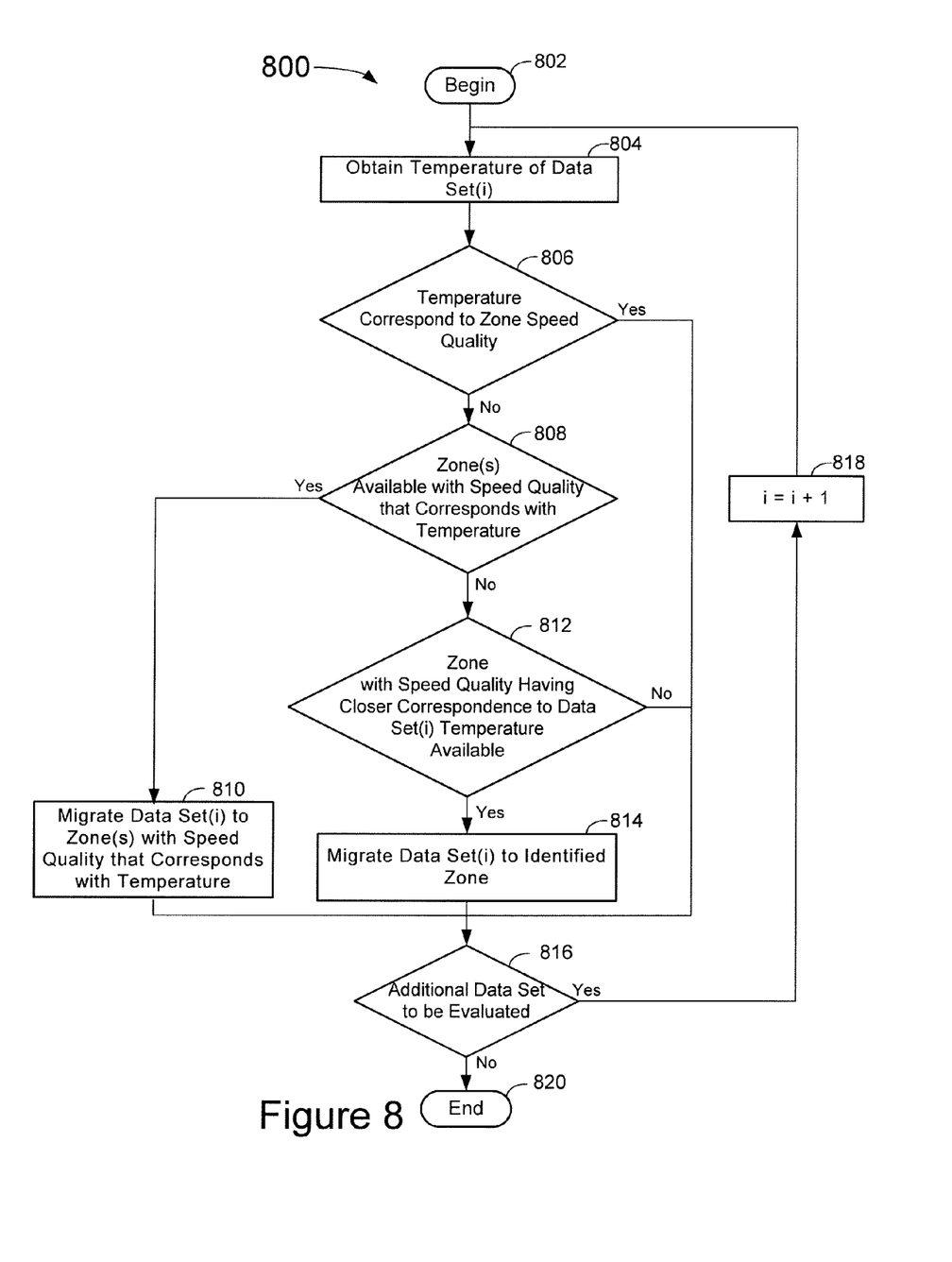
FIG. 8 is a flowchart of a data migration routine that facilitates transfer of data between storage device zones of different speed quality ratings in accordance with an embodiment.

FIG. 8 is a flowchart 800 of a data migration routine that facilitates transfer of data between storage device zones of different speed quality ratings implemented in accordance with an embodiment. The processing steps of FIG. 8 may be implemented as computer-executable instructions tangibly embodied on a computer-readable medium executable by a processing system, such as one or more of the processing nodes $105_1$-$105_Y$ depicted in FIG. 1.

The data migration routine is invoked (step 802), and the temperature of a data set(i) is read (step 804). An evaluation is then made to determine if the data set(i) is stored on a storage device zone having a speed quality rating corresponding to the data set(i) temperature (step 806). In the event the data set(i) is stored on a storage device zone having a speed quality rating that corresponds to the data set(i) temperature, the data migration routine may proceed to evaluate whether an additional data set remains for evaluation (step 816).

Returning again to step 806, in the event the date set(i) temperature does not correspond to the speed quality rating of the storage device zone on which the data set(i) is stored, an evaluation may be made to determine if a storage device zone having a speed quality rating corresponding to the data set(i) temperature is available for storage of the data set(i) (step 808). For example, if the data set(i) has a access frequency quantifier of HOT, the evaluation of step 808 may determine if a storage zone having a speed quality rating of FAST is available. If a storage device zone having a speed quality rating corresponding to the data set(i) temperature is available, the data set(i) may then be transferred from the storage device zone on which the data set(i) is currently stored to the identified storage device zone having the speed quality rating identified as corresponding to the data set(i) temperature (step 810). The data migration routine may then proceed to evaluate whether an additional data set(i) remains for evaluation according to step 816.

Returning again to step 808, in the event that a storage device zone having a speed quality rating corresponding to the data set(i) temperature is not available for storage of the data set(i), an evaluation may then be made to determine if a storage device zone having a speed quality rating in closer correspondence to the data set(i) temperature relative to the speed quality rating of the storage device zone on which the data set is currently stored is available for storage of the data set(i) (step 812). If a storage device zone having a speed quality rating in closer correspondence to the data set(i) temperature is not available for storage of the data set(i), the migration routine may then proceed to determine whether any additional data sets remain for evaluation according to step 816. If a storage device zone having a speed quality rating in closer correspondence to the data set(i) temperature is determined to be available for storage of the data set(i) at step 812, the data set(i) may be migrated to the identified storage device zone (step 814). For example, assume the data set(i) has an access frequency quantifier of HOT and the data set(i) is stored on a storage zone having a speed quality rating of SLOW. In this instance, if the migration routine determines a storage zone having a speed quality rating of AVERAGE is available (which differs from the storage zone speed quality rating (FAST) associated with the data set(i) temperature of HOT by less discrete speed quality ratings than the zone on which the data set(i) is stored), the data set(i) may then be migrated to the identified storage zone according to step 814. The data migration routine may proceed to evaluate whether any additional data sets remain for evaluation according to step 816.

If an additional data set remains for evaluation at step 816, the migration routine may increment the index variable, i, (step 818), and proceed to obtain the temperature of the data set(i) according to step 804. When all data sets have been evaluated for possible migration, the migration routine cycle may then end (step 820).

As described, mechanisms that facilitate optimized storage and migration of data in a massively parallel processing system are provided. A device profiler allows testing storage device zones and assignment of a respective speed quality rating thereto based on the zone's evaluated access speed. A temperature monitor may periodically evaluate the frequency with which data is accessed within the system and may update a data access frequency quantifier, such as a data temperature, accordingly. A data access frequency, such as a data temperature, may be associated with a storage device zone speed quality rating such that data having a particular data access frequency is preferably stored on a device storage zone having a speed quality rating associated with the data access frequency quantifier. In an embodiment, the association between data access frequency quantifiers and the storage device zone speed quality ratings may be made in a hierarchical association such that quantifiable differentials may be ascertained between a particular access frequency quantifier and a storage device zone speed quality rating. In this manner, when no storage zone having a speed quality rating that is associated with data having a particular access frequency quantifier is available for storage of the data, a storage zone having a speed quality rating more proximate the speed quality rating associated with the access frequency quantifier may be identified for storage or migration of the data.

The flowcharts of FIGS. 6-8 depict process serialization to facilitate an understanding of disclosed embodiments and are not necessarily indicative of the serialization of the operations being performed. In various embodiments, the processing steps described in FIGS. 6-8 may be performed in varying order, and one or more depicted steps may be performed in parallel with other steps. Additionally, execution of some processing steps of FIGS. 6-8 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of facilitating data storage in a database system that includes one or more processing nodes operable to process data stored in a database, comprising:

evaluating, by the one or more processing nodes, each of a plurality of contiguous storage zones of a storage medium for a respective access speed indicative of speed by which the continuous storage zone can be accessed;

assigning, based on the evaluating, a respective speed quality rating to each of the plurality of zones, wherein the speed quality ratings are indicative of quantifiable differentials of the access speeds of the plurality of contiguous storage zones;

receiving a data set to be stored on the storage medium, wherein the data set has an associated access frequency quantifier associated therewith;

identifying, at least partly based on the quantifiable differentials, at least one zone of the plurality of zones to be associated with the access frequency quantifier for storing the data set;

storing the data set on the at least one zone having the speed quality rating associated with the access frequency quantifier; and identifying a first data set associated with a first access frequency quantifier associated therewith that is stored on a first contiguous storage zone of the storage medium, wherein the first contiguous storage zone has a first speed quality rating assigned thereto and wherein the first access frequency quantifier is not associated with the first speed quality rating;

determining that the storage medium does not have any contiguous storage zone with an assigned speed quality rating that is associated with the first access frequency quantifier;

identifying a second speed quality rating that is associated with the first access frequency quantifier;

identifying a second contiguous storage zone that has a third speed quality rating assigned thereto that differs from the second speed quality rating by a lesser number of discrete quality ratings than the first speed quality rating; and migrating the first data set from the first contiguous storage zone to the second contiguous storage zone.

2. The method of claim 1, wherein the evaluating of each of the plurality of contiguous storage zones of a storage medium for a respective access speed comprises evaluating at least one of a read access speed and a write access speed of each of the plurality of contiguous storage zones.

3. The method of claim 1, wherein the evaluating of each of the plurality of contiguous storage zones of a storage medium for a respective access speed comprises evaluating a plurality of contiguous storage zones of a plurality of storage mediums for a respective access speed, and wherein assigning a respective speed quality rating to each of the plurality of zones comprises assigning a respective speed quality rating to each of the plurality of contiguous storage zones of the plurality of storage mediums.

4. The method of claim 1, further comprising: identifying a first data set having a first access frequency quantifier associated therewith that is stored on a first contiguous storage zone of the storage medium, wherein the first contiguous storage zone has a first speed quality rating assigned thereto and wherein the first access frequency quantifier is not associated with the first speed quality rating; and migrating the first data set to a second contiguous storage zone of the storage medium having a second speed quality rating assigned thereto that is associated with the first access frequency quantifier.

5. A non-transient computer-readable medium storing at least computer-executable instructions for facilitating data storage in a database system that includes one or more processing nodes, wherein the computer-executable instructions, when executed, cause the one or more processing nodes to:

evaluate, by the one or more processing nodes, each of a plurality of contiguous storage zones of a storage medium for a respective access speed indicative of speed by which the continuous storage zone can be accessed;

assign, based on the evaluation, a respective speed quality rating to each of the plurality of zones, wherein the speed quality ratings are indicative of quantifiable of the access speeds of the plurality of contiguous storage zones;

receive a data set to be stored on the storage medium, wherein the data set has an associated access frequency quantifier associated therewith;

identify, at least partly based on the quantifiable differentials, at least one zone of the plurality of zones to be associated with the access frequency quantifier for storing the data set;

store the data set on the at least one zone having the speed quality rating associated with the access frequency quantifier;

identifying a first data set associated with a first access frequency quantifier associated therewith that is stored on a first contiguous storage zone of the storage medium, wherein the first contiguous storage zone has a first speed quality rating assigned thereto and wherein the first access frequency quantifier is not associated with the first speed quality rating;

determining that the storage medium does not have any contiguous storage zone with an assigned speed quality rating that is associated with the first access frequency quantifier;

identifying a second speed quality rating that is associated with the first access frequency quantifier;

identifying a second contiguous storage zone that has a third speed quality rating assigned thereto that differs from the second speed quality rating by a lesser number of discrete quality ratings than the first speed quality rating; and migrating the first data set from the first contiguous storage zone to the second contiguous storage zone.

6. The computer-readable medium of claim 5, wherein the instructions that evaluate the plurality of contiguous storage zones of a storage medium for a respective access speed comprise instructions that evaluate at least one of a read access speed and a write access speed of each of the plurality of contiguous storage zones.

7. The computer-readable medium of claim 5, wherein the instructions that evaluate a plurality of contiguous storage zones of a storage medium for a respective access speed comprise instructions that evaluate a plurality of contiguous storage zones of a plurality of storage mediums for a respective access speed, and wherein the instructions that assign a respective speed quality rating to each of the plurality of zones comprise instructions that assign a respective speed quality rating to each of the plurality of contiguous storage zones of the plurality of storage mediums.

8. The computer-readable medium of claim 5, further comprising instructions that, when executed, cause the processing node to: identify a first data set having a first access frequency quantifier associated therewith that is stored on a first contiguous storage zone of the storage medium, wherein the first contiguous storage zone has a first speed quality rating assigned thereto and wherein the first access frequency quantifier is not associated with the first speed quality rating; and migrate the first data set to a second contiguous storage zone of the storage medium having a second speed quality rating assigned thereto that is associated with the first access frequency quantifier.

9. A computer system, comprising:
at least one storage medium; and
at least one processing node operable to:

evaluate each of a plurality of contiguous storage zones of the storage medium for a respective access speed indicative of speed by which the continuous storage zone can be accessed;

assign, based on the evaluation, a respective speed quality rating to each of the plurality of zones, wherein the speed quality ratings are indicative of quantifiable of the access speeds of the plurality of contiguous storage zones;

receive a data set to be stored on the storage medium, wherein the data set has an associated access frequency quantifier associated therewith;

identify, at least partly based on the quantifiable differentials, at least one zone of the plurality of zones to be associated with the access frequency quantifier for storing the data set;

store the data set on the at least one zone having the speed quality rating associated with the access frequency quantifier; and identify a first data set having a first access frequency quantifier associated therewith that is stored on a first contiguous storage zone of the storage medium, wherein the first contiguous storage zone has a first speed quality rating assigned thereto and wherein the first access frequency quantifier is not associated with the first speed quality rating;

determine that the storage medium does not have any contiguous storage zone with an assigned speed quality rating that is associated with the first access frequency quantifier;

identify a second speed quality rating that is associated with the first access frequency quantifier;

identify a second contiguous storage zone that has a third speed quality rating assigned thereto that differs from the second speed quality rating by a lesser number of discrete quality ratings than the first speed quality rating; and migrate the first data set from the first contiguous storage zone to the second contiguous storage zone.

10. The system of claim 9, wherein the processing node evaluates the plurality of contiguous storage zones of a storage medium for a respective access speed by evaluating at least one of a read access speed and a write access speed of each of the plurality of contiguous storage zones.

11. The system of claim 9, wherein the processing node evaluates a plurality of contiguous storage zones of a storage medium for a respective access speed by evaluating a plurality of contiguous storage zones of a plurality of storage mediums for a respective access speed, and wherein the processing nodes assigns a respective speed quality rating to each of the plurality of contiguous storage zones of the plurality of storage mediums.

12. The system of claim 9, wherein the processing node identifies a first data set having a first access frequency quantifier associated therewith that is stored on a first contiguous storage zone of the storage medium, wherein the first contiguous storage zone has a first speed quality rating assigned thereto and wherein the first access frequency quantifier is not associated with the first speed quality rating, and wherein the processing node migrates the first data set to a second contiguous storage zone of the storage medium having a second speed quality rating assigned thereto that is associated with the first access frequency quantifier.

* * * * *